United States Patent
Chen et al.

(10) Patent No.: US 11,914,510 B2
(45) Date of Patent: Feb. 27, 2024

(54) LAYER INTERLEAVING IN MULTI-LAYERED MEMORY

(71) Applicant: Micron Technology Inc., Boise, ID (US)

(72) Inventors: Mikai Chen, Sunnyvale, CA (US); Zhengang Chen, San Jose, CA (US); Charles See Yeung Kwong, Redwood City, CA (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 17/736,824

(22) Filed: May 4, 2022

(65) Prior Publication Data
US 2022/0261345 A1 Aug. 18, 2022

Related U.S. Application Data (63) Continuation of application No. 16/531,305, filed on Aug. 5, 2019, now Pat. No. 11,341,046.

(51) Int. Cl.
*G06F 12/06* (2006.01)
*G06F 12/02* (2006.01)

(52) U.S. Cl.
CPC ...... *G06F 12/0607* (2013.01); *G06F 12/0207* (2013.01); *G06F 2212/1032* (2013.01)

(58) Field of Classification Search
None
See application file for complete search history.

(56) References Cited

U.S. PATENT DOCUMENTS

| | | | |
|---|---|---|---|
| 2008/0034153 A1* | 2/2008 | Lee | G06F 12/0246 711/E12.079 |
| 2016/0202910 A1* | 7/2016 | Ravimohan | G06F 12/0246 711/103 |
| 2016/0314833 A1* | 10/2016 | Lee | G11C 16/3418 |
| 2017/0116070 A1* | 4/2017 | Alrod | G11C 16/26 |
| 2018/0188956 A1 | 7/2018 | Cr et al. | |
| 2018/0217751 A1* | 8/2018 | Agarwal | G11C 16/3495 |
| 2019/0042130 A1* | 2/2019 | Vittal Prabhu | G11C 11/5642 |
| 2019/0051353 A1* | 2/2019 | Oh | G11C 13/004 |
| 2019/0272115 A1 | 9/2019 | Hu | |
| 2020/0249870 A1 | 8/2020 | Gola et al. | |

* cited by examiner

*Primary Examiner* — Stephanie Wu
(74) *Attorney, Agent, or Firm* — Lowenstein Sandler LLP (57) ABSTRACT

In a memory sub-system, data can be received to be stored at a 3-dimensional (3D) memory component in response to a write operation. A first location of a first layer of the 3D memory component is determined at which to store a first portion of the data, where the first layer is within a first logical unit. A second location of a second layer of the 3D memory component is determined at which to store a second portion of the data, where the second layer is within a second logical unit that is different than the first logical unit. The first portion of the data is caused to be stored in first memory cells at the first location within the first layer. The second portion of the data is caused to be stored in second memory cells at the second location within the second layer.

20 Claims, 5 Drawing Sheets

LAYER INTERLEAVING IN MULTI-LAYERED MEMORY

RELATED APPLICATIONS

The present application is a continuation of U.S. patent application Ser. No. 16/531,305, filed Aug. 5, 2019, which is incorporated herein by this reference.

TECHNICAL FIELD

The present disclosure generally relates to a memory sub-system, and more specifically, relates to layer interleaving in multi-layered memory sub-systems.

BACKGROUND

A memory sub-system can be a storage system, such as a solid-state drive (SSD), or a hard disk drive (HDD). A memory sub-system can be a memory module, such as a dual in-line memory module (DIMM), a small outline DIMM (SO-DIMM), or a non-volatile dual in-line memory module (NVDIMM). A memory sub-system can include one or more memory components that store data. The memory components can be, for example, non-volatile memory components and volatile memory components. In general, a host system can utilize a memory sub-system to store data at the memory components and to retrieve data from the memory components.

BRIEF DESCRIPTION OF THE DRAWINGS

The present disclosure will be understood more fully from the detailed description given below and from the accompanying drawings of various implementations of the disclosure.

DETAILED DESCRIPTION

Aspects of the present disclosure are directed to layer interleaving in multi-layered memory in memory sub-systems. A memory sub-system is also hereinafter referred to as a "memory device." An example of a memory sub-system is a storage device that is coupled to a central processing unit (CPU) via a peripheral interconnect (e.g., an input/output bus, a storage area network). Examples of storage devices include a solid-state drive (SSD), a flash drive, a universal serial bus (USB) flash drive, and a hard disk drive (HDD). Another example of a memory sub-system is a memory module that is coupled to the CPU via a memory bus. Examples of memory modules include a dual in-line memory module (DIMM), a small outline DIMM (SO-DIMM), a non-volatile dual in-line memory module (NVDIMM), etc. The memory sub-system can be a hybrid memory/storage sub-system. In general, a host system can utilize a memory sub-system that includes one or more memory components. The host system can provide data to be stored at the memory sub-system and can request data to be retrieved from the memory sub-system.

A conventional memory sub-system can include memory components with memory cells that are arranged in multiple layers or "decks." Memory configured in this manner, typically referred to as multi-layered or 3-Dimensional (3D) memory, can include several layers that each include multiple memory cells organized in 2-Dimensional (2D) arrays. 3D memory offers several advantages over 2D memory since 3D memory allows memory cells to be layered so that storage can be substantially increased without reducing the size of the cells themselves. In some memory sub-systems, layering memory cells can allow each memory cell to be larger, which can increase storage capacity in comparison to 2D memory arrays.

In conventional memory sub-systems, host data can be written to 3D memory cells using system access units such as codewords. Typically, codewords are written to 3D memory cells where a page size of the memory sub-system is much smaller than the size of the codeword. Thus, the contents of the codeword can often be split across multiple pages (or other similarly configured addressable units). Conventional memory sub-systems typically perform write operations to 3D memory by selecting a single layer to which to write each portion of a codeword spanning multiple pages. Thus, the entire codeword can be located on memory cells that are included in the same layer of 3D memory. While this configuration can reduce system complexity, it can also lead to decreased reliability and increased error rates due to repetitive reads and rights to the same layer.

Conventional memory sub-systems that are configured in this manner can typically exhibit different characteristics (write wear, disturb, etc.) across different layers that can increase bit error rates. Thus, the overall performance and reliability of implementations writing across a single layer can be inconsistent due to the differences between the layers. For example one layer's performance and reliability may be within normal limits, while another layer may experience decreased performance and reliability. In some instances, this can be due to its relative position within the layer stack, the number of reads and writes directed to that layer relative to other layers, or the like. Thus, disparities in performance and reliability between layers, can have a negative impact on the performance and reliability of the component overall. Additionally, as a 3D memory component operates under a combination of various noise mechanisms over its lifespan, the 3D memory component can exhibit larger variations in endurance characteristics over time. Moreover, 3D memory can experience significant increases in observed bit error rates from one read operation to the next read operation (typically referred to as bit error rate overshoot). Further, read operations can cause nearby cells in the same memory component to change over time, and thus become inadvertently programmed, typically referred to as "read disturb." Since 3D memory adds a third dimensional direction, different layers of the memory component can exhibit different disturb directions, and therefore, significantly increased levels of overall read disturb for the component when one layer is repeatedly being read.

Aspects of the present disclosure address the above and other deficiencies by performing layer interleaving for write operations in multi-layered memory. When data is received to be stored that spans multiple pages of a 3D memory component, the data can be written such that each portion of the data (e.g., each page) is written across different layers of the 3D memory. A received codeword can be divided into pages to be written, and for each page, a different layer of the 3D memory component can be targeted for the write operation than for that of the previously written page. Thus, the data can be interleaved across the multiple layers of the 3D memory component to reduce the impacts of repetitive writes and subsequent reads to any one particular layer.

Advantages of the present disclosure include, but are not limited to, improved reliability as well as decreased bit error rates of a 3D memory component during its operating life. Implementing the layer interleaving process of the present disclosure achieves the capacity benefits of conventional implementations without the associated increases in bit error rates and read disturb since both read and write operations can access multiple layers for a single codeword as opposed to repeatedly reading and writing to the same layer if the single codeword were stored across a single layer. Additionally, since the reliability of the memory component is improved, the performance of a memory sub-system that includes the memory component can also improve, since fewer resources are used to perform error correction operations that would result from a memory component that has been impacted by increased bit error rates that result from single layer accesses.

Figure 1:
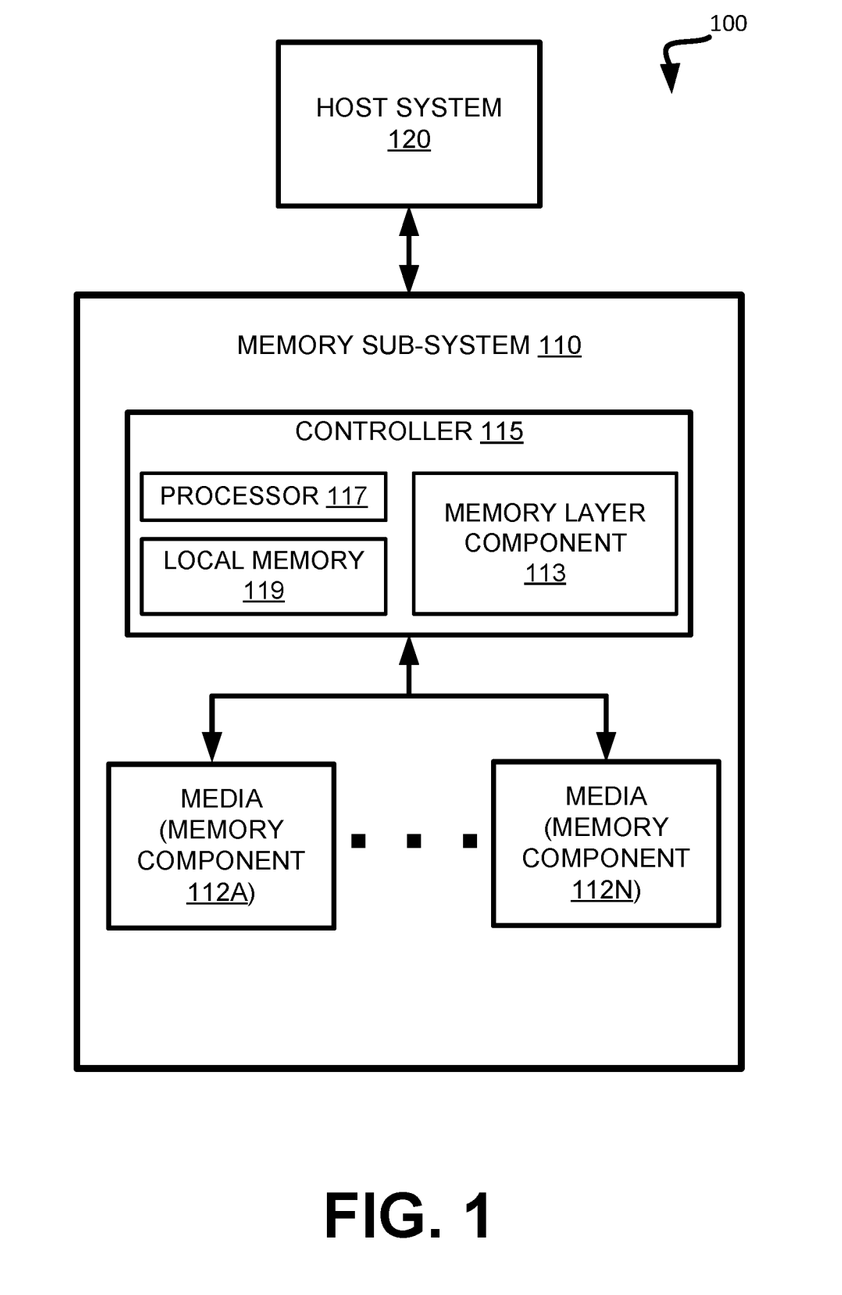
FIG. 1 illustrates an example computing environment that includes a memory sub-system in accordance with some embodiments of the present disclosure.

FIG. 1 illustrates an example computing environment 100 that includes a memory sub-system 110 in accordance with some embodiments of the present disclosure. The memory sub-system 110 can include media, such as memory components 112A to 112N. The memory components 112A to 112N can be volatile memory components, non-volatile memory components, or a combination of such. In some embodiments, the memory sub-system is a storage system. An example of a storage system is a SSD. In some embodiments, the memory sub-system 110 is a hybrid memory/storage sub-system. In general, the computing environment 100 can include a host system 120 that uses the memory sub-system 110. For example, the host system 120 can write data to the memory sub-system 110 and read data from the memory sub-system 110.

The host system 120 can be a computing device such as a desktop computer, laptop computer, network server, mobile device, or such computing device that includes a memory and a processing device. The host system 120 can include or be coupled to the memory sub-system 110 so that the host system 120 can read data from or write data to the memory sub-system 110. The host system 120 can be coupled to the memory sub-system 110 via a physical host interface. As used herein, "coupled to" generally refers to a connection between components, which can be an indirect communicative connection or direct communicative connection (e.g., without intervening components), whether wired or wireless, including connections such as electrical, optical, magnetic, etc. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), etc. The physical host interface can be used to transmit data between the host system 120 and the memory sub-system 110. The host system 120 can further utilize an NVM Express (NVMe) interface to access the memory components 112A to 112N when the memory sub-system 110 is coupled with the host system 120 by the PCIe interface. The physical host interface can provide an interface for passing control, address, data, and other signals between the memory sub-system 110 and the host system 120.

The memory components 112A to 112N can include any combination of the different types of non-volatile memory components and/or volatile memory components. An example of non-volatile memory components includes a negative-and (NAND) type flash memory. Each of the memory components 112A to 112N can include one or more arrays of memory cells such as single level cells (SLCs) or multi-level cells (MLCs) (e.g., triple level cells (TLCs) or quad-level cells (QLCs)). In some embodiments, a particular memory component can include both an SLC portion and a MLC portion of memory cells. Each of the memory cells can store one or more bits of data (e.g., data blocks) used by the host system 120. Although non-volatile memory components such as NAND type flash memory are described, the memory components 112A to 112N can be based on any other type of memory such as a volatile memory. In some embodiments, the memory components 112A to 112N can be, but are not limited to, random access memory (RAM), read-only memory (ROM), dynamic random access memory (DRAM), synchronous dynamic random access memory (SDRAM), phase change memory (PCM), magneto random access memory (MRAM), negative-or (NOR) flash memory, electrically erasable programmable read-only memory (EEPROM), and a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. Furthermore, the memory cells of the memory components 112A to 112N can be grouped as memory pages or data blocks that can refer to a unit of the memory component used to store data.

The memory system controller 115 (hereinafter referred to as "controller") can communicate with the memory components 112A to 112N to perform operations such as reading data, writing data, or erasing data at the memory components 112A to 112N and other such operations. The controller 115 can include hardware such as one or more integrated circuits and/or discrete components, a buffer memory, or a combination thereof. The controller 115 can be a microcontroller, special purpose logic circuitry (e.g., a field programmable gate array (FPGA), an application specific integrated circuit (ASIC), etc.), or other suitable processor. The controller 115 can include a processor (processing device) 117 configured to execute instructions stored in local memory 119. In the illustrated example, the local memory 119 of the controller 115 includes an embedded memory configured to store instructions for performing various processes, operations, logic flows, and routines that control operation of the memory sub-system 110, including handling communications between the memory sub-system 110 and the host system 120. In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the controller 115, in another embodiment of the present disclosure, a memory sub-system 110 may not include a controller 115, and may instead rely upon external control (e.g., provided by an external host, or by a processor or controller separate from the memory sub-system).

In general, the controller 115 can receive commands or operations from the host system 120 and can convert the commands or operations into instructions or appropriate commands to achieve the desired access to the memory components 112A to 112N. The controller 115 can be responsible for other operations such as wear leveling operations, garbage collection operations, error detection and error-correcting code (ECC) operations, encryption operations, caching operations, and address translations between a logical block address and a physical block address that are associated with the memory components 112A to 112N. The controller 115 can further include host interface circuitry to communicate with the host system 120 via the physical host interface. The host interface circuitry can convert the commands received from the host system into command instructions to access the memory components 112A to 112N as well as convert responses associated with the memory components 112A to 112N into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the controller 115 and decode the address to access the memory components 112A to 112N.

The memory sub-system 110 includes a memory layer component 113 that can be used to perform memory layer interleaving during write operations for data to be stored at multi-layered (e.g., 3D) memory components 112A to 112N as well during read operations for data already stored at memory components 112A to 112N. In some embodiments, the controller 115 includes at least a portion of the memory layer component 113. For example, the controller 115 can include a processor 117 (processing device) configured to execute instructions stored in local memory 119 for performing the operations described herein. In some embodiments, the memory layer component 113 is part of the host system 120, an application, or an operating system. In various embodiments, the memory layer component 113 can function as a sub-component of an address translation component of the controller 115. In such cases, the memory layer component 113 can function as a part of address translation from host address to media address for the memory sub-system 110. In particular, the memory layer component 113 can be invoked during translation from a physical address to a memory device address as described herein.

The memory layer component 113 can, upon receiving data to be stored at memory components 112A to 112N, determine a first location of a first layer of the memory components 112A to 112N to store a first portion of the data. The memory layer component 113 can then determine a second location of a second layer of the memory components 112A to 112N to store a second portion of the data, where the second layer is different from the first layer, and store the data across the first location of the first layer and the second location of the second layer. In various implementations, this process can be repeated for each portion of data included in a received codeword, interleaving each portion of the data across different layers of the memory components 112A to 112N.

Additionally, upon receiving a request to read the stored data from the memory components 112A to 112N, the memory layer component 113 can determine a first location of a first layer of the memory components 112A to 112N that store a first portion of the data. The memory layer component 113 can then determine a second location of a second layer of the memory component that stores a second portion of the data, where the second layer is different from the first layer, and retrieve the data from the determined layers of memory components 112A to 112N. As with the write operation, in various implementations, this process can be repeated for each portion of data needed to retrieve the entire codeword from memory components 112A to 112N. Further details with regards to the operations of the memory layer component 113 are described below.

Figure 2:
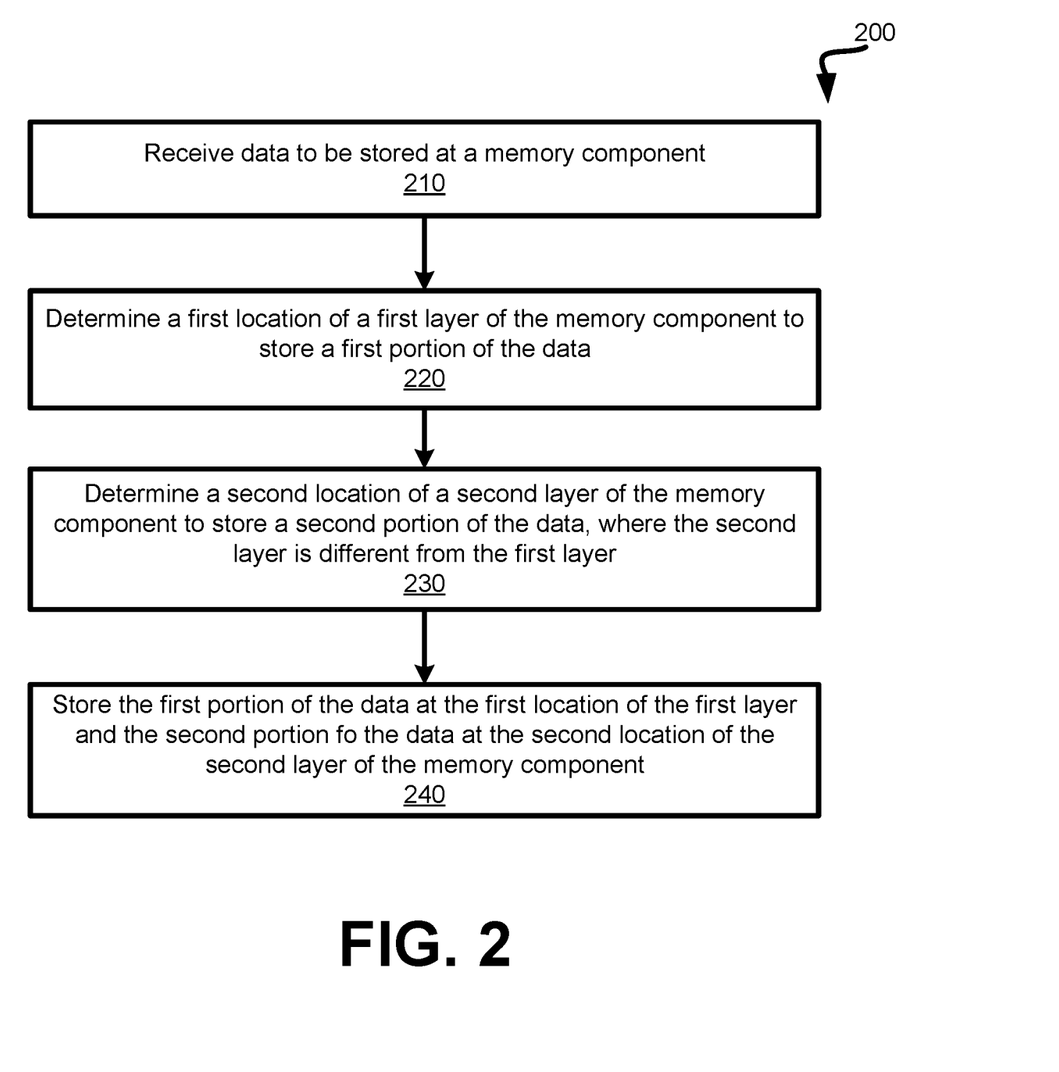
FIG. 2 is a flow diagram of an example method to perform layer interleaving for a write operation for a multi-layered memory sub-system in accordance with some embodiments.

FIG. 2 is a flow diagram of an example method 200 to perform layer interleaving for a write operation for a multi-layered memory sub-system. The method 200 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 200 is performed by the memory layer component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

As shown in FIG. 2, at operation 210, the processing logic receives data to be stored at a memory component. In some implementations, the memory component can be a 3-Dimensional (3D) memory component. For example, the 3D memory component can be 3D cross-point array memory. As noted above, 3D memory can be made up of multiple layers of memory cells, where each layer can include a 2-Dimensional (2D) grid of memory cells, and where the layers of the 3D memory component can be stacked vertically in relation to each other. In some implementations, the memory component can be byte-addressable. In other words, each byte stored at the memory component can be referenced by a unique address. Byte-addressable memory can allow write/read accesses at the granularity of multiple bytes, such as 4 bytes, 8 bytes, 16 bytes, 32 bytes, etc. Such units can be referred to as pages. Page size in byte-addressable memory can be much smaller than the page size in non-byte-addressable memory, such as NAND flash, where the page size can be multiple kilobytes. In various implementations, a memory device's page address can include a layer address field that can identify a specific layer in the memory component, as well as other address fields (e.g., an intra-layer address) that can identify a page in that layer.

The data received at operation 210 can be a system access unit (SAU), such as an error correction code (ECC) codeword. In various implementations, the SAU can be the memory sub-system unit that includes information such as host data, ECC parity information, metadata, or other similar information. In some instances, an SAU can include more than one ECC codeword. As noted above, the data in an SAU can be stored at the memory component in multiple addressable units of the memory component (e.g., memory pages) where the size of the SAU is greater than the size of each addressable unit (e.g., each memory page). For example, a single 4-kilobyte codeword can be stored at a memory component configured with 1-kilobyte memory pages by using 4 pages of the memory component.

At operation 220, the processing logic determines a first location of a first layer of the memory component to store a first portion of the data. As noted above, the data received at operation 210 can be stored at multiple addressable units (e.g., memory pages) of the memory component. For each addressable unit that is to store a portion of the data, the processing logic can determine a target layer to which to direct the data write operation such that the data for the entire codeword is interleaved across multiple layers of the memory component. Thus, at operation 220, the processing logic can identify a target addressable unit as well as a layer for that addressable unit for a portion of the received data.

In various implementations, the memory component can be configured with multiple layers. Once the processing logic identifies an available addressable unit to which to store the data, a target layer can then be determined sequentially, randomly, based on the previously completed write operation, or based on collected performance data associated with the various layers. In one illustrative example, each time a new codeword is received to be stored, the processing logic can reset a layer counter that is used to designate the target layer for each portion of the data to be stored. Each time a portion of the data is written, the counter can be updated (e.g., incremented or decremented) and used to identify the target layer within the address of the data to be stored. For example, the first data portion received can be stored at layer '0', the second at layer '1', the third at layer '2', etc. The layer counter value can be used as a component of the memory address for the target location to which to store each portion of the received data, which is also referred to as a candidate location herein.

In some instances, the amount of data to be stored for a single codeword can exceed the number of layers within the memory component. In such instances, processing logic can determine the target layer in view of the total number of layers for the memory component. For example, if a codeword is received that spans 20 pages of a memory component, where the memory component is configured with 10 layers, processing logic can reset the counter once the tenth page has been written such that the eleventh page can be written at layer '0', the twelfth page at layer 1, the thirteenth page at layer '2', and so on. In some implementations, rather than starting the counter at '0' and incrementing the counter for each page written, processing logic can set the counter to the total number of layers and decrement the counter for each page written until the counter reaches 0, after which the counter can again be set to the total number of layers.

In some instances, the counter can be maintained across received codewords without being reset for each codeword. In other words, if the last page of a codeword is stored at layer '3', the first page of the next received codeword can be stored at layer '4' without resetting the counter back to '0' for an implementation that increments the counter, or layer '2' for an implementation that decrements the counter. In other cases, rather than incrementing or decrementing the counter sequentially, the layer can be selected randomly or pseudo-randomly (e.g., using a random number generator).

In some implementations, the target layer can be determined using observed performance metrics for the various layers of the memory component. For example, processing logic can determine a target layer based on observed endurance values. The endurance of the memory component refers to the number of write operations or the number of program/erase operations performed on a memory cell of the memory component before data can no longer be reliably stored at the memory cell. For example, SLC NAND flash memory cells that have a lower data density can have an endurance threshold of 100,000 program erase cycles whereas TLC NAND flash memory cells that have a higher data density can have an endurance threshold of 3,000 program erase cycles.

In such instances, processing logic can determine a candidate layer (e.g., based on one of the techniques noted above), then determine an endurance value associated with the memory cells of the target layer. The processing logic can then determine whether a layer is a viable target based on the observed endurance of the memory cell (or cells) for that layer. To make this determination, the processing logic can compare the observed endurance value (or values) to a predetermined threshold that is associated with the memory cells of the memory component. As noted above, depending on its density, a memory cell can have different maximum endurance thresholds before the cell becomes unreliable. In some implementations, the endurance threshold used in the comparison can be set to this value. Alternatively, the endurance threshold used in the comparison can be set to a number that is lower than the maximum threshold (e.g., 70%, 80%, etc.) Responsive to determining that the observed endurance value satisfies an endurance threshold, the processing logic can select that layer as the layer to store the first portion of the received codeword. For example, the observed value can satisfy the endurance threshold if the observed endurance value is less than or equal to the set threshold. Responsive to determining that the observed endurance value of the target layer does not satisfy the endurance threshold, the processing logic can select another layer of the memory component to which to store the data of that page. For example, an observed value that is greater than the set threshold would not satisfy the endurance threshold.

In some implementations, the processing logic can determine a target layer based on an observed bit error rates. As noted above with respect to bit error rate overshoot and disturb, repetitive read and write operations can result in significant increases in observed bit error rates from one read operation to the next read operation. The processing logic can determine a candidate layer (e.g., based on one of the techniques noted above), then determine an error rate value associated with the memory cells of the target layer. The processing logic can then determine whether a layer is a viable target based on the observed bit error rates of the memory cell (or cells) for that layer. To make this determination, the processing logic can compare the observed bit error rate value (or values) to a predetermined threshold that is associated with the memory cells of the memory component. In some implementations, a memory cell with a higher number of errors in relation to other memory cells can become unreliable. In some implementations, the error threshold used in the comparison can be set to a value indicative of a maximum acceptable error rate for a memory component. Alternatively, the error threshold used in the comparison can be set to a number that is lower than the maximum (e.g., 70%, 80%, etc.) Responsive to determining that the observed error rate value satisfies an error threshold, the processing logic can select that layer as the layer to store the first portion of the received codeword. For example, the observed value can satisfy the error threshold if the observed error rate value is less than or equal to the set threshold. Responsive to determining that the observed error rate value of the target layer does not satisfy the error threshold, the processing logic can select another layer of the memory component to which to store the data of that page. For example, an observed value that is greater than the set threshold would not satisfy the endurance threshold At operation 230, the processing logic determines a second location of a second layer of the memory component to store a second portion of the data, where the second layer is different from the first layer. In various implementations, the processing logic can determine the location of the layer for the second portion of the data as described above at operation 220. As noted above, the processing logic can determine the second location of the second layer based on a combination of the location of the layer selected for the first portion of the data as well the total number of layers for the memory component. For example, the processing logic can determine a first address value associated with the first location of the first layer. The processing logic can then determine the total number of layers for the memory component, and subsequently determine the address value in view of the first address value and the total number of layers (e.g., by incrementing the layer number, decrementing the layer number, determining a random layer number within the range of the total number of layers, etc.).

In some implementations, the second portion of the data can be stored on the same logical unit (e.g., the same die) of the memory component as the first portion of the data. In such instances, the processing logic can determine a logical unit of the memory component to which to store the data. At operation 220, the processing logic can determine the first location of the first layer at the logical unit of the memory component. Then, at operation 230, the processing logic can determine the location of the second layer at the same logical unit of the memory component.

In some implementations, the second portion of the data can be stored on a different logical unit (e.g., a different die) of the memory component than the first portion of the data. In such instances, at operation 220, the processing logic can determine a first logical unit of the memory component to which to store the first portion of the data, and subsequently determine the first location of the first layer at the first logical unit of the memory component. Then, at operation 230, the processing logic can determine a second logical unit of the memory component to which to store the second portion of the data, where the second logical unit is different from the first logical unit. Subsequently, the processing logic can determine the second location of the second layer at the second logical unit of the memory component.

At operation 240, the processing logic stores the first portion of the data at the first location of the first layer and the second portion of the data at the second location of the second layer of the memory component. In various implementations, operations 220 and 230 can be repeated for each portion of data for the codeword received at operation 210. Thus, while method 200 describes the processing of two portions of data and two target layers, in various implementations, similar steps can be conducted for codewords with additional portions of data to be stored at additional pages and associated layers of the memory component. Additionally, while method 200 describes operations 220 and 230 as being performed in a particular order, in some implementations these operations can be performed in parallel.

An illustrative example of performing the layer interleaving process is described below in conjunction with FIG. 3.

Figure 3:
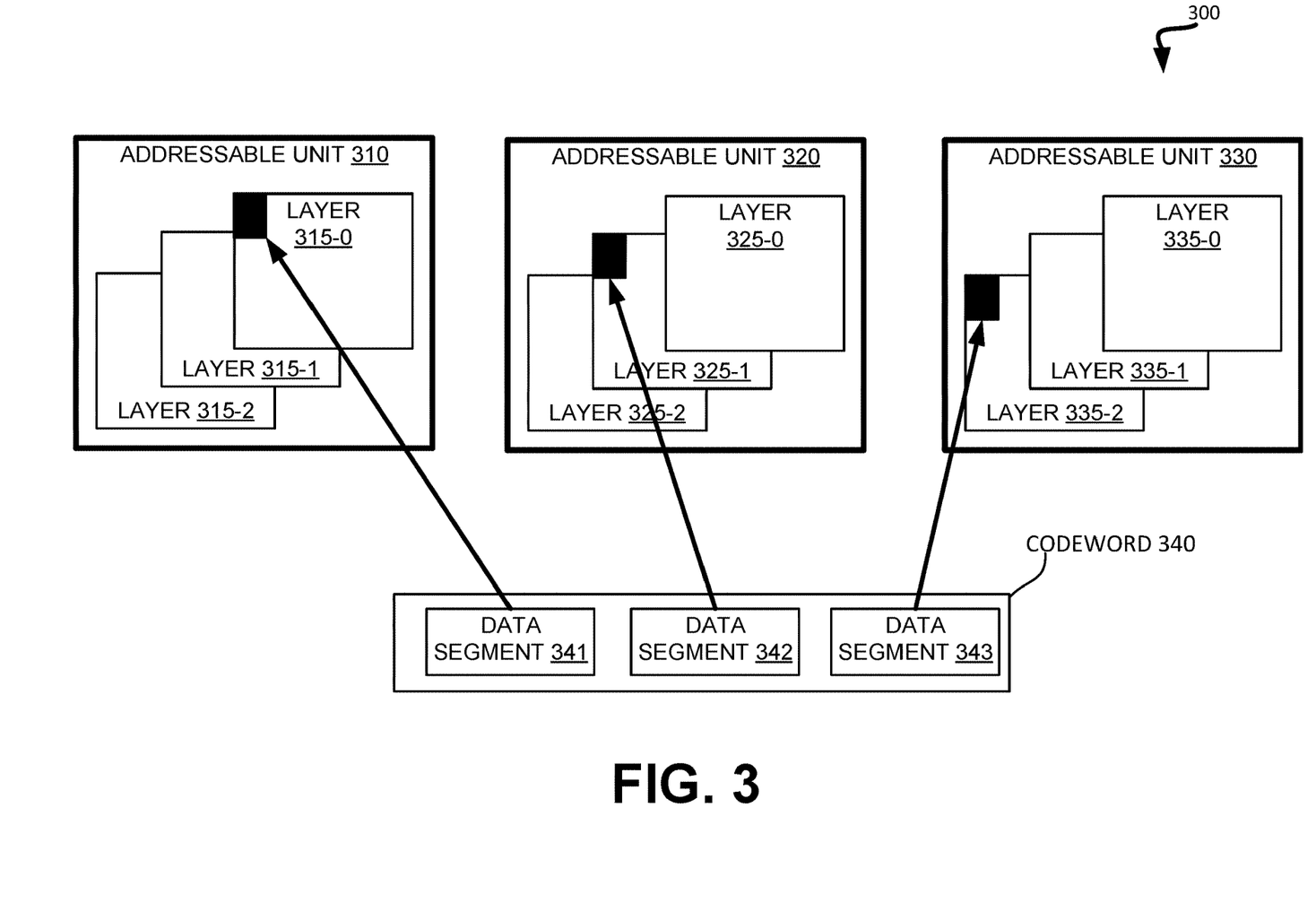
FIG. 3 illustrates an example of layer interleaving for a multi-layered memory sub-system in accordance with some embodiments of the present disclosure.

FIG. 3 illustrates performing layer interleaving for a memory sub-system using multi-layered memory in accordance with some embodiments of the present disclosure. In some embodiments, the layer interleaving can be performed by the memory layer component 113 of FIG. 1 and as described above with respect to FIG. 2 and below with respect to FIG. 4.

As shown in FIG. 3, a codeword 340 can be received to be stored at the 3D memory component 300. The codeword 340 includes data that when apportioned to the particular addressable unit size (e.g., page size) of memory component 300, can be divided into three portions (data segment 341, data segment 342, and data segment 343). As described above with respect to FIG. 2, the memory layer component (e.g., memory layer component 113 of FIG. 1) can determine target pages for each portion of data as well as target layers of each page to which to store the applicable portion of data.

Upon receiving the codeword 340, the memory layer component can determine a location of a layer of the memory component 300 to store data segment 341. As shown, addressable unit 310 can be identified as the target page to which data segment 341 can be stored. After determining a target page, the memory layer component can then determine the target layer for that page using any of the methods described above with respect to FIG. 2. In some implementations, the memory layer component starts at layer '0' and increments the layer number for each subsequently stored page. Thus, data segment 341 can be stored at layer 315-0 (e.g., layer '0') of addressable unit (e.g., page) 310.

Once a target page and layer for data segment 341 has been determined, the memory layer component can proceed to determine the target pages and layers for the other data segments of codeword 340. As described above, the memory layer component can first identify a target addressable unit 320, then determine a layer within that addressable unit. In some implementations, the layer for data segment 342 can be determined based on the layer selected for data segment 341 (e.g., layer '0') as well as the total number of layers in memory component 300 (e.g., 3 total layers). Thus, since data segment 341 was stored using layer '0', the layer memory component can increment the layer counter from 0 to 1, and set the layer number for data segment 342 to layer '1'. Accordingly, data segment 342 can be stored at layer 325-1 of addressable unit 320.

Similarly, the memory layer component can identify a target addressable unit 330 for data segment 343, and then determine a layer within that addressable unit. In some implementations, the layer for data segment 343 can be determined based on the layer selected for data segment 342 (e.g., layer '1') as well as the total number of layers in memory component 300 (e.g., 3 total layers). Thus, since data segment 342 was stored using layer '1', the layer memory component can increment the layer counter from 1 to 2, and set the layer number for data segment 343 to layer '2'. Accordingly, data segment 343 can be stored at layer 335-2 of addressable unit 330.

Although FIG. 3 illustrates performing layer interleaving for a memory component with three layers, the process can apply to memory components with fewer layers (e.g., two layers) or more layers. For example, where the codeword 340 includes more than three data segments, the memory layer component can reset the layer count to 0 and store any additional data segments accordingly. Thus, a fourth data segment (not pictured) can be stored at another data segment (not pictured) at layer '0'. Additionally, FIG. 3 depicts that the received data is stored in the same relative location on each layer selected (e.g., the top left memory cells of the layer). In some implementations, the relative location for each portion of data can be a factor in the process described above for determining the target layer and memory cells for each data segment. In such cases, the same relative location can be selected for each data segment to be stored. In other implementations, the received data may be stored in different relative locations. In an illustrative example, data segment 341 can be stored at the top left memory cell of layer 315-0, data segment 342 can be stored at the lower left of layer 325-1, and data segment 343 can be stored at the lower right of layer 335-2. In other examples, the data segments can be stored in other relative locations.

Moreover, while FIG. 3 depicts interleaving data with respect to a single memory component, in some implementations, the data may be interleaved with respect to multiple memory components or logical units. In such instances, one or more of addressable units 310, 320, and 330 can be located on different logical units (e.g., different dies). For example, addressable unit 310 can be located on a first logical unit, addressable unit 320 can be located on a second logical unit, and addressable unit 330 can be located on a third logical unit. Similarly, some addressable units can be co-located on a single logical unit while others can be located on a separate logical unit. For example, addressable units 310 and 320 can be located on a first logical unit while addressable unit 330 can be located on a second logical unit, and so on.

Upon receiving a request to retrieve codeword 340 from memory component 300, the memory layer component can identify the appropriate addressable units 310, 320, and 330 where the data segments have been stored, determine the applicable layers storing the data, and construct the codeword 340 using the retrieved data. The process of performing layer interleaving for a read operation is described in further detail below with respect to FIG. 4.

Figure 4:
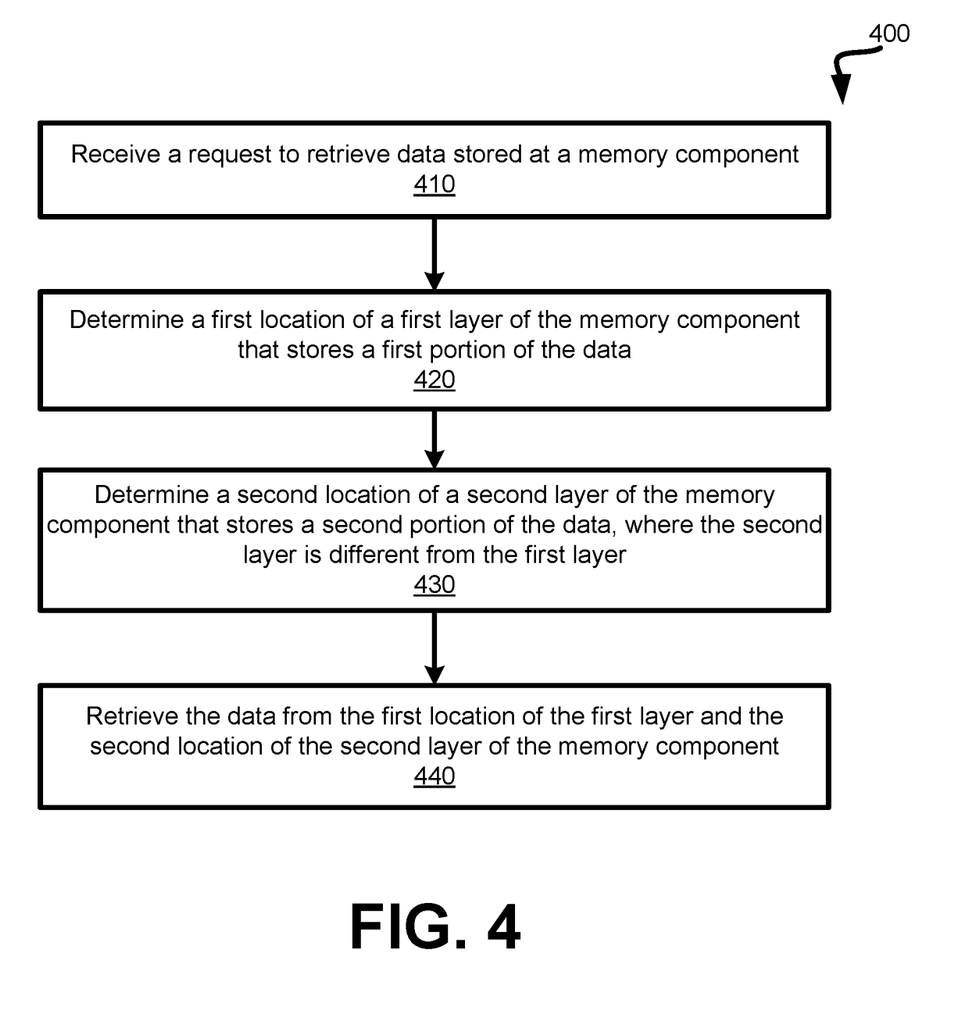
FIG. 4 is a flow diagram of an example method to perform layer interleaving for a read operation at a multi-layered memory sub-system in accordance with some embodiments of the present disclosure.

FIG. 4 is a flow diagram of an example method 400 to perform layer interleaving for a read operation for a multi-layered memory sub-system in accordance with some embodiments of the present disclosure. The method 400 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 400 is performed by the memory layer component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

As shown in FIG. 4, at operation 410, the processing logic receives a request retrieve data stored at a memory component. As noted above, the memory component can be a 3D memory component made up of multiple layers of memory cells, where each layer can include a 2-Dimensional (2D) grid of memory cells, and where the layers of the 3D memory component can be stacked vertically in relation to each other. In some implementations, the memory component can be byte-addressable. As noted above, byte-addressable memory can allow read access at the granularity of multiple bytes, where the unit of granularity represents a page. In some implementations, the read unit page size can be different than the write unit page size. For example, a read unit can be sized at 4 pages whereas a write unit can be sized at 16 pages (e.g., 4×4 pages). In both instances, the read and write process can interleave the associated data over 4 layers.

At operation 420, the processing logic determines a first location of a first layer of the memory component that stores a first portion of the data. As noted above, the data to be retrieved can be stored across multiple memory pages (e.g., multiple addressable units) where each page can be stored using a different layer of the 3D memory component. Additionally, in some implementations, the data to be retrieved can be stored across multiple logical units (e.g., multiple dies). In other words, different addressable units can be located on different logical units. Thus, at operation 420, the processing logic can identify one of the addressable units that stores a portion of the codeword to be retrieved as well as the corresponding layer. For example, processing logic can receive a request for a logical address of the data to be received. The processing logic can then determine that the logical address is mapped to multiple locations at the memory component, where each location can include a reference to the particular layer and the particular memory cell within that layer. In some implementations, the processing logic can determine the order in which the multiple portions of the data were stored, and subsequently return the portions of data in that order. Alternatively, the processing logic can return the portions of data in an order other than that in which the data was stored.

At operation 430, the processing logic determines a second location of a second layer of the memory component that stores a second portion of the data, where the second layer is different from the first layer. In some implementations, processing logic can determine the second location of the second layer based on the information associated with the first location of the first layer that was determined at operation 420. For example, the processing logic can determine a first address value associated with the first location of the first layer. The processing logic can then determine the total number of layers for the memory component, and subsequently determine the address value in view of the first address value and the total number of layers (e.g., by incrementing the layer number, decrementing the layer number, determining a random layer number within the range of the total number of layers, etc.).

In some implementations, the second portion of the data can be stored on the same logical unit (e.g., the same die) of the memory component as the first portion of the data. In such instances, the processing logic can determine a logical unit of the memory component from which to retrieve the data. At operation 420, the processing logic can determine the first location of the first layer at the logical unit of the memory component. Then, at operation 430, the processing logic can determine the location of the second layer at the same logical unit of the memory component.

In some implementations, the second portion of the data can be stored on a different logical unit (e.g., a different die) of the memory component than the first portion of the data. In such instances, at operation 420, the processing logic can determine a first logical unit of the memory component from which to retrieve the first portion of the data, and subsequently determine the first location of the first layer at the first logical unit of the memory component. Then, at operation 430, the processing logic can determine a second logical unit of the memory component from which to retrieve the second portion of the data, where the second logical unit is different from the first logical unit. Subsequently, the processing logic can determine the second location of the second layer at the second logical unit of the memory component.

At operation 440, the processing logic retrieves the data from the first location of the first layer and the second location of the second layer of the memory component. In various implementations, operations 420 and 430 can be repeated for each portion of data for the codeword to be retrieved by the request received at operation 410. Thus, while method 400 describes the processing of two portions of data and two target layers, in various implementations, similar steps can be conducted for codewords with additional portions of data to be retrieved from additional pages and associated layers of the memory component. Additionally, while method 400 describes operations 420 and 430 as being performed in a particular order, in some implementations these operations can be performed in parallel.

Figure 5:
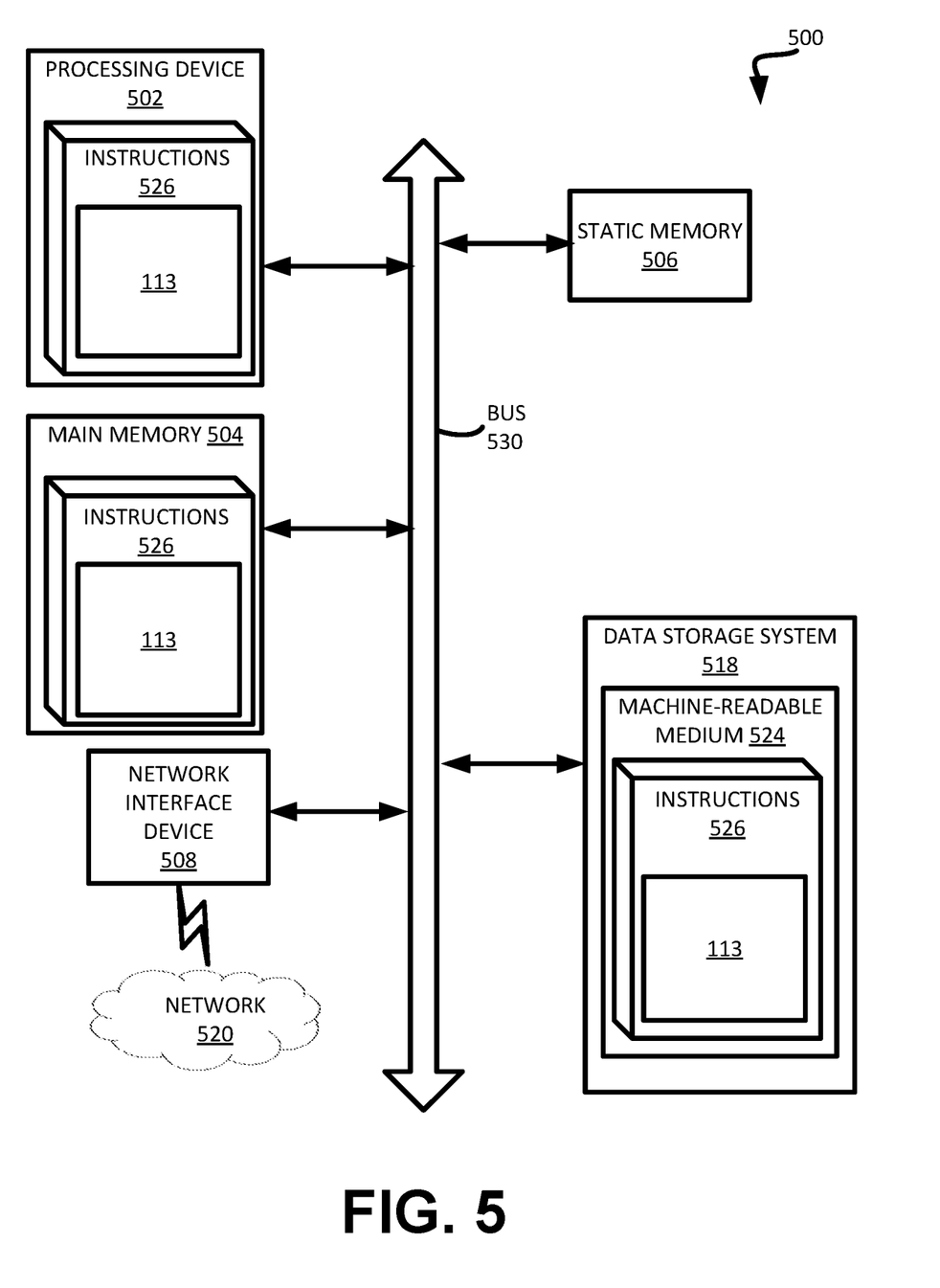
FIG. 5 is a block diagram of an example computer system in which implementations of the present disclosure can operate.

FIG. 5 illustrates an example machine of a computer system 500 within which a set of instructions, for causing the machine to perform any one or more of the methodologies discussed herein, can be executed. In some embodiments, the computer system 500 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to memory layer component 113 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, digital or non-digital circuitry, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 500 includes a processing device 502, a main memory 504 (e.g., read-only memory (ROM), flash memory, dynamic random access memory (DRAM) such as synchronous DRAM (SDRAM) or Rambus DRAM (RDRAM), etc.), a static memory 506 (e.g., flash memory, static random access memory (SRAM), etc.), and a data storage system 518, which communicate with each other via a bus 530.

Processing device 502 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 502 can also be one or more special-purpose processing devices such as an application specific integrated circuit (ASIC), a field programmable gate array (FPGA), a digital signal processor (DSP), network processor, or the like. The processing device 502 is configured to execute instructions 526 for performing the operations and steps discussed herein. The computer system 500 can further include a network interface device 508 to communicate over the network 520.

The data storage system 518 can include a machine-readable storage medium 524 (also known as a non-transitory computer-readable medium) on which is stored one or more sets of instructions 526 or software embodying any one or more of the methodologies or functions described herein. The instructions 526 can also reside, completely or at least partially, within the main memory 504 and/or within the processing device 502 during execution thereof by the computer system 500, the main memory 504 and the processing device 502 also constituting machine-readable storage media. The machine-readable storage medium 524, data storage system 518, and/or main memory 504 can correspond to the memory sub-system 110 of FIG. 1.

In one embodiment, the instructions 526 include instructions to implement functionality corresponding to a memory layer component (e.g., the memory layer component 113 of FIG. 1). While the machine-readable storage medium 524 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A method comprising:
   receiving data to be stored at a 3-dimensional (3D) memory component of a memory sub-system in response to a write operation;
   identifying a first layer within a first logical unit and a second layer within a second logical unit of the 3D memory component based on randomly selecting layers from a plurality of layers of the 3D memory component;
   determining, by a processing device of the memory sub-system, a first location of the first layer of the 3D memory component at which to store a first portion of the data;
   determining a second location of the second layer of the 3D memory component at which to store a second portion of the data; and
   causing, by a processing device, the first portion of the data to be stored in first memory cells at the first location within the first layer and the second portion of the data to be stored in second memory cells at the second location within the second layer.

2. The method of claim 1, wherein the 3D memory component is byte-addressable and the data comprises one of a system access unit (SAU) or at least one error correction code (ECC) codeword.

3. The method of claim 1, wherein identifying the first layer and the second layer further comprises at least one of:
   selecting layers from the plurality of layers based on a previously completed write operation; or
   selecting layers from the plurality of layers based on collected performance data associated with the plurality of layers.

4. The method of claim 1, wherein determining the second location of the second layer comprises:
   determining a first address value associated with the first location of the first layer;
   determining a total number of layers of the 3D memory component; and
   determining a second address value associated with the second location of the second layer in view of the first address value and the total number of layers.

5. The method of claim 1, further comprising:
   identifying the first logical unit of the 3D memory component for the first layer; and
   identifying the second logical unit of the 3D memory component for the second layer.

6. The method of claim 1, further comprising:
   determining a candidate location of a candidate layer of the 3D memory component;
   determining an endurance value associated with the candidate location of the candidate layer;
   responsive to determining that the endurance value satisfies an endurance threshold, setting the first location of the first layer to the candidate location of the candidate layer; and
   responsive to determining that the endurance value does not satisfy the endurance threshold, determining another location of another layer of the 3D memory component for the first location of the first layer.

7. The method of claim 1, further comprising:
   determining a candidate location of a candidate layer of the 3D memory component;
   determining an error rate value associated with the candidate location of the candidate layer;
   responsive to determining that the error rate value satisfies an error threshold, setting the first location of the first layer to the candidate location of the candidate layer; and
   responsive to determining that the error rate value does not satisfy the error threshold, determining another location of another layer of the 3D memory component for the first location of the first layer.

8. A system comprising:
   a 3-dimensional (3D) memory component; and
   a processing device, operatively coupled with the 3D memory component, wherein the processing device is to perform operations comprising:
   receiving data to be stored at the 3D memory component in response to a write operation;
   identifying a first layer within a first logical unit and a second layer within a second logical unit of the 3D memory component based on randomly selecting layers from a plurality of layers of the 3D memory component;
   determining a first location of the first layer of the 3D memory component at which to store a first portion of the data;
   determining a second location of the second layer of the 3D memory component at which to store a second portion of the data;
   causing the first portion of the data to be stored in first memory cells at the first location within the first layer; and
   causing the second portion of the data to be stored in second memory cells at the second location within the second layer.

9. The system of claim 8, wherein the 3D memory component is byte-addressable and the data comprises one of a system access unit (SAU) or at least one error correction code (ECC) codeword.

10. The system of claim 8, wherein identifying the first layer and the second layer further comprises at least one of:
   selecting layers from the plurality of layers based on a previously completed write operation; or
   selecting layers from the plurality of layers based on collected performance data associated with the plurality of layers.

11. The system of claim 8, wherein to determine the second location of the second layer, the operations further comprise:
   determining a first address value associated with the first location of the first layer;
   determining a total number of layers of the 3D memory component; and
   determining a second address value associated with the second location of the second layer in view of the first address value and the total number of layers.

12. The system of claim 8, wherein the operations further comprise:
   identifying the first logical unit of the 3D memory component for the first layer; and
   identifying the second logical unit of the 3D memory component for the second layer.

13. The system of claim 8, wherein the operations further comprise:
   determining a candidate location of a candidate layer of the 3D memory component;
   determining an endurance value associated with the candidate location of the candidate layer;
   responsive to determining that the endurance value satisfies an endurance threshold, setting the first location of the first layer to the candidate location of the candidate layer; and
   responsive to determining that the endurance value does not satisfy the endurance threshold, determining another location of another layer of the 3D memory component for the first location of the first layer.

14. The system of claim 8, wherein operations further comprise:
   determining a candidate location of a candidate layer of the 3D memory component;
   determining an error rate value associated with the candidate location of the candidate layer;
   responsive to determining that the error rate value satisfies an error threshold, setting the first location of the first layer to the candidate location of the candidate layer; and
   responsive to determining that the error rate value does not satisfy the error threshold, determining another location of another layer of the 3D memory component for the first location of the first layer.

15. A non-transitory computer-readable medium comprising instructions, which when executed by a processing device of a memory sub-system, cause the processing device to perform operations comprising:
   receiving data to be stored at a 3-dimensional (3D) memory component of the memory sub-system in response to a write operation;
   identifying a first layer within a first logical unit and a second layer within a second logical unit based on randomly selecting layers from a plurality of layers of the 3D memory component;
   determining a first location of the first layer of the 3D memory component at which to store a first portion of the data;
   determining a second location of the second layer of the 3D memory component at which to store a second portion of the data; and
   causing the first portion of the data to be stored in first memory cells at the first location within the first layer and the second portion of the data to be stored in second memory cells at the second location within the second layer.

16. The non-transitory computer-readable medium of claim 15, wherein the 3D memory component is byte-addressable and the data comprises one of a system access unit (SAU) or at least one error correction code (ECC) codeword.

17. The non-transitory computer-readable medium of claim 15, wherein identifying the first layer and the second layer further comprises at least one of:
   selecting layers from the plurality of layers based on a previously completed write operation; or
   selecting layers from the plurality of layers based on collected performance data associated with the plurality of layers.

18. The non-transitory computer-readable medium of claim 15, wherein the operations further comprise:
   identifying the first logical unit of the 3D memory component for the first layer; and
   identifying the second logical unit of the 3D memory component for the second layer.

19. The non-transitory computer-readable medium of claim 15, wherein the operations further comprise:
   determining a candidate location of a candidate layer of the 3D memory component;
   determining an endurance value associated with the candidate location of the candidate layer;
   responsive to determining that the endurance value satisfies an endurance threshold, setting the first location of the first layer to the candidate location of the candidate layer; and
   responsive to determining that the endurance value does not satisfy the endurance threshold, determining another location of another layer of the 3D memory component for the first location of the first layer.

20. The non-transitory computer-readable medium of claim 15, wherein the operations further comprise:
   determining a candidate location of a candidate layer of the 3D memory component;
   determining an error rate value associated with the candidate location of the candidate layer;
   responsive to determining that the error rate value satisfies an error threshold, setting the first location of the first layer to the candidate location of the candidate layer; and
   responsive to determining that the error rate value does not satisfy the error threshold, determining another location of another layer of the 3D memory component for the first location of the first layer.

* * * * *